United States Patent [19]
Jacob

[11] Patent Number: 5,797,801
[45] Date of Patent: Aug. 25, 1998

[54] CONSTANT VELOCITY FIXED JOINT

[75] Inventor: Werner Jacob, Frankfurt, Germany

[73] Assignee: Lohr & Bromkamp GmbH, Offenbach am Main, Germany

[21] Appl. No.: 561,631

[22] Filed: Nov. 22, 1995

[30] Foreign Application Priority Data

Nov. 23, 1994 [DE] Germany .............. 44 41 629.6

[51] Int. Cl.⁶ ................................................ F16D 3/224
[52] U.S. Cl. .................................. 464/145; 464/906
[58] Field of Search .......................... 464/145, 906, 464/143, 139

[56] References Cited

U.S. PATENT DOCUMENTS

| | | | |
|---|---|---|---|
| 4,185,476 | 1/1980 | Krude | 464/145 |
| 4,459,122 | 7/1984 | Rehfeld | 464/143 |
| 4,950,206 | 8/1990 | Jacob | 464/145 X |
| 4,968,287 | 11/1990 | Jacob | 464/145 |
| 5,376,052 | 12/1994 | Jacob et al. | 464/145 |
| 5,453,052 | 9/1995 | Hartz et al. | 464/145 |
| 5,580,313 | 12/1996 | Jacob et al. | 464/145 |

FOREIGN PATENT DOCUMENTS

| | | |
|---|---|---|
| 2079110 | 11/1971 | France. |
| 2717769 | 9/1995 | France. |
| 4317606C1 | 1/1995 | Germany. |
| 4410298A1 | 9/1995 | Germany. |
| 2278418 | 11/1994 | United Kingdom. |

*Primary Examiner*—Eileen A. Dunn
*Attorney, Agent, or Firm*—Harness, Dickey & Pierce, P.L.C.

[57] ABSTRACT

A constant velocity fixed joint has having a hollow outer part (1), an inner part (7) and a cage (15). The parts are centered relative to one another in the radial direction by balls (19) held in the cage (15). A guiding element (22) is adjustably supported in the radial direction against a supporting element (28). The supporting element (22) is fixed relative to the outer part (1). Arrangement and design of the guiding element (22) are such that its contact face (24) forms a plane which contains the articulation center (27). As a result, the setting of the inner part (7) relative to the outer part (1) is advantageously affected in the radial direction. In this way, a low-friction joint is produced.

14 Claims, 2 Drawing Sheets

CONSTANT VELOCITY FIXED JOINT

The invention relates to a fixed constant velocity joint with a hollow outer part which includes apertures at its two ends. The inner face of the outer part includes outer running grooves which extend in meridian planes with reference to the longitudinal axis of the outer part. An inner part is arranged in the cavity of the outer part. The outer face of the inner part includes inner running grooves which extend in meridian planes with reference to the longitudinal axis of the inner part. One each of the outer and inner running grooves are arranged opposite one another and, as a pair, jointly accommodate a ball for torque transmitting purposes. All balls are guided in windows of a cage arranged in the space between the inner face of the outer part and the outer face of the inner part. Both the inner running grooves and the outer running grooves, starting from the first aperture of the outer part, are designed to be undercut-free. The cage, via a hollow spherical partial face, is guided on an outer spherical face of the inner part, which is arranged towards the second aperture of the outer part. Furthermore, the cage is arranged with play relative to the inner face of the outer part. In addition, the joint includes guiding means. The guiding means includes a first concavely spherical guiding face on the inner part and a second convexly spherical guiding face of a guiding element. The guiding element, via a contact face, is radially adjustably guided on a setting face of a supporting element. The supporting element is axially fixed relative to the outer part. Also, the longitudinal axis of the outer part is positioned perpendicularly on the setting face. The inner part, the outer part and the cage are articulatable relative to one another around an articulation center. As a result, the balls are guided into a plane which bisects the angle between the outer part and inner part. The cage passes through half the articulation angle.

In U.S. Pat. No. 5,376,052 issued Dec. 27, 1994, the contact face and the setting face are arranged with an offset relative to the articulation center of the joint. As a result, during articulation, the process of the inner part being set relative to the outer part is advantageously affected due to the inner part being radially adjustable relative to the outer part.

SUMMARY OF THE INVENTION

It is an object of the invention to improve the setting movement of the inner part relative to the outer part such that any friction between the parts is further reduced.

In accordance with the invention, the guiding element is formed as a spherical portion or spherical layer and the planar face of the spherical portion or one of the planar faces of the spherical layer serves as the contact face. The contact face constitutes the plane containing the articulation center. The supporting element, via its setting face, extends as far as the contact face.

An advantage of this embodiment is that the adjustment movement of the inner part relative to the outer part can be carried out exactly in the place where the movement occurs upon articulation of the outer part relative to the inner part around the articulation center. The change in position of the cage and thus the balls held by the cage, which occur upon articulation, takes place around the articulation center towards both sides. Thus, for this reason, too, advantageous conditions exist during the adjustment process. Radial changes in position which occur upon articulation due to the balls adjusting in the outer running grooves and inner running grooves are permitted without the risk of any jamming or disadvantageous effects on friction. The radial movements are extremely slight but they advantageously affect the overall friction conditions of the joint and thus the friction losses. The friction losses are permitted in the articulation center.

Friction reduction is achieved, compared to the state of the art, since the radial forces of adjustment no longer act, via the lever arm, on the setting and contact face of the guiding element. If the joint is in the extended position, and if the longitudinal axis of the outer part and the longitudinal axis of the inner part are aligned relative to one another, the setting plane is the plane which contains the ball centers. This is particularly advantageous because when fixed constant velocity joints are articulated from the extended position, initially a catching effect frequently occurs. Because of the permitted movement of adjustment of the outer part relative to the inner part in the radial direction, such catching cannot occur with the fixed constant velocity joint in accordance with the invention.

It is possible to fix the supporting element directly to the outer part or to attach it to a holding element fixed to the outer part in fixed constant velocity joints intended for large articulation angles and, for example, steered and driven wheels of a motor vehicle, the supporting element in the region adjoining the part including the setting face, includes a tapered part in order to achieve the necessary freedom of movement of the cage and inner part relative to the supporting element, which results from the change in angle. If the supporting element is directly fixed to the holding element, it may be a plate metal part.

In the case of a supporting element intended for a constant velocity fixed joint with larger articulation angles, the supporting element includes a plate with the setting face and, adjoining same, a tapered shank. The shank has a journal whose cross-section is stepped relative to the shank. The holding element includes a bore to receive the journal.

In the assembled condition, the supporting element rests against a stop face of the outer part. In the case of an embodiment divided into two, when the supporting element is not directly supported on the outer part, the holding element rests against the stop face of the outer part.

In order to achieve an advantageous play setting and to ensure that all components participating in articulation and adjustment are very highly accurately centered relative to the articulation center, the stop face of the outer part is formed during the stamping or calibration of the outer running grooves of the outer part To achieve the required degrees of accuracy, the outer running grooves, after the outer part has been produced by a non-chip producing forming operation, for example formed in a warm condition, are subsequently again stamped or calibrated. The stamping or calibration operation is accomplished by introducing a tool to contact both the outer running grooves and the stop face of the outer part. The tracks and thus the theoretical articulation center formed by the outer running grooves are produced with the maximum degree of accuracy relative to the stop face. In consequence, the setting face, too, may be aligned relative thereto with the greatest possible accuracy.

For the purpose of advantageously affecting the friction conditions, especially initial friction starting from the extended position, the contact face of the guiding element includes an indentation in its center. If the guiding element is provided in the form of a spherical layer, both guiding element planar faces include an indentation in their centers. There is a simple way to produce the indentations, by boring through the guiding element. The exit regions of the bores in the two parallel faces form the indentations.

Furthermore, the concave spherical guiding face of the inner part is also provided with an indentation in the region of the longitudinal axis of the inner part. The setting face of the supporting element also includes an indentation in the region of the longitudinal axis of the outer part. This measure ensures overall that self-inhibition cannot occur. Furthermore, the indentations are suitable for use as pockets to receive lubricant.

From the following detailed description taken in conjunction with the accompanying drawings and subjoined claims, other objects and advantages of the present invention will become apparent to those skilled in the art.

BRIEF DESCRIPTION OF THE PREFERRED EMBODIMENT

Two preferred embodiments of the invention are illustrated in the drawing wherein.

DETAILED DESCRIPTION OF THE DRAWINGS

Figure 1:
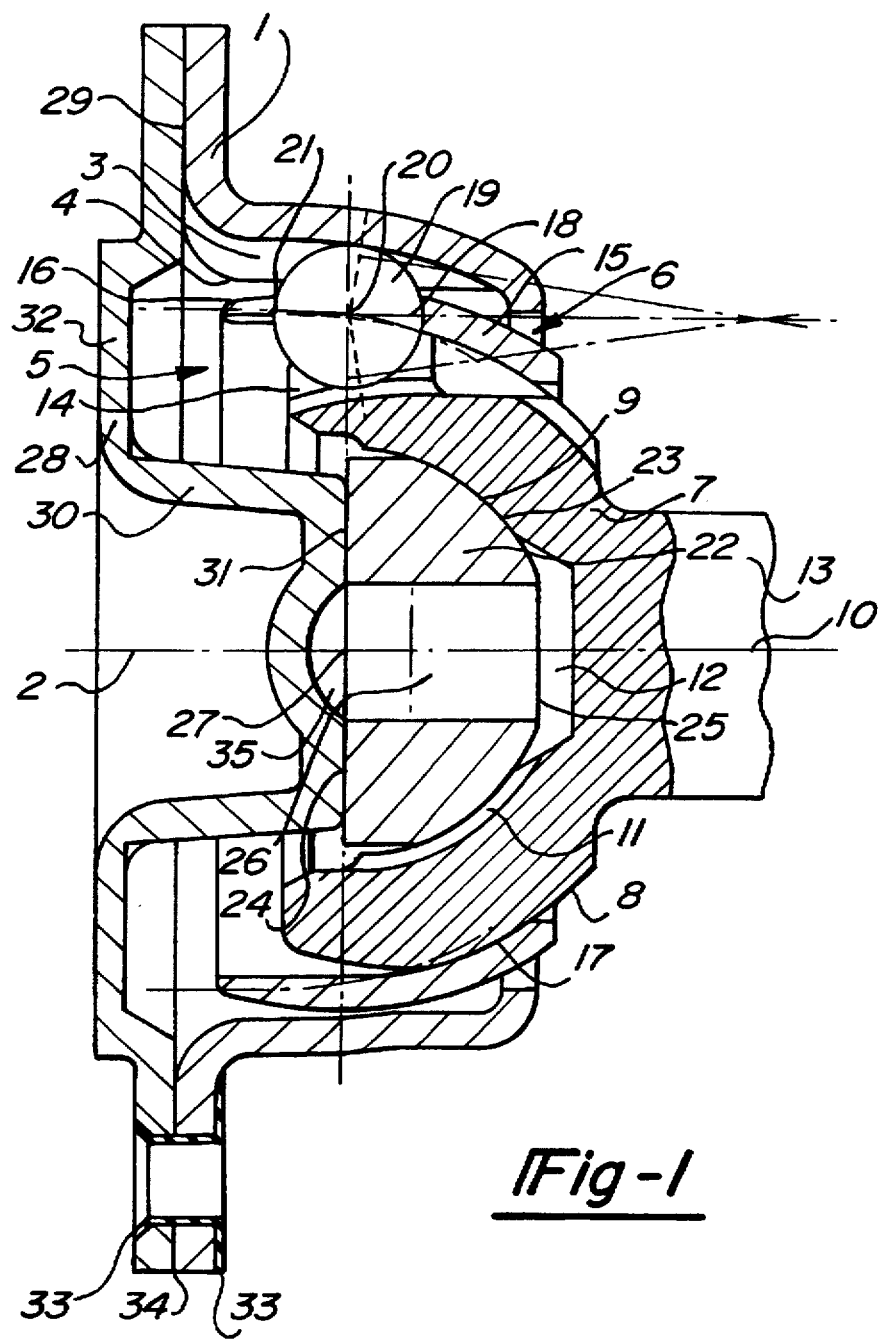
FIG. 1 is a longitudinal section view through a constant velocity fixed joint for small articulation angles in accordance with the present invention.

In the constant velocity fixed joint illustrated in FIG. 1, the outer part 1 is a plate metal part. It is hollow and includes a first aperture 5 in the region of an outwardly extending flange. The opposite end of the outer part includes a second aperture 6. The inner face 4 of the outer part 1 includes circumferentially distributed outer running grooves 3 which extend in meridian planes with reference to the longitudinal axis 2 of the outer part. The outer running grooves 3 start from the first aperture 5 and extend from there towards the second aperture 6 in an undercut-free way. This means that the track base of the outer running grooves over the distance from the first aperture 5 to the second aperture 6 approaches the longitudinal axis 2 of the outer part. The constant velocity fixed joint includes an inner part 7 which is a solid part. The inner part 7 may be produced by a non-chip producing warm forming operation; however, part of its functional faces are finished to their end dimensions by calibrating or stamping.

The outer face of the inner part 7 includes inner running grooves 14 which extend in meridian planes with reference to the longitudinal axis 10 of the inner part. In the assembled condition of the constant velocity fixed joint, the inner running grooves 14 extend undercut-free from the first aperture 5 of the outer part 1. This means that the track base extends so that, at the beginning of the inner running grooves 14, it is at a shorter distance from the longitudinal axis 10 of the inner part.

The distance increases towards the second aperture 6. A connecting journal 13 is integrally formed onto the inner part 7. A concave guiding face 9 facing the aperture 5 is worked into the inner part 7. The guiding face 9 has the shape of a hollow spherical partial face and is centered on the longitudinal axis 10 of the inner part. In the region of the longitudinal axis 10 of the inner part, the guiding face 9 is provided with an indentation 12. Grooves 11 extend from the indentation 12. A plurality of grooves 11 are circumferentially distributed relative to the longitudinal axis 10 of the inner part. The guiding face 9 starts from the end of the inner part 7 facing the aperture 5 and also extends in an undercut-free way. The guiding face 9 and the inner running grooves 14 are produced jointly in a tool, and at a later stage, after the non-chip producing warm forming operation, a calibrating or stamping operation takes place to achieve the final shape and finish-dimensions. On the part of its outer face facing away from the aperture 5 in the assembled condition, the inner part 7 includes an outer spherical face 8.

A cage 15 is arranged in the radial space between the inner face 4 of the outer part 1 and the outer face of the inner part 7. The cage 15 includes a hollow spherical partial face 17 in its interior. The cage 15, via face 17, is guided on the outer spherical face 8 of the inner part 7. The outer face 16 of the cage is arranged at a distance from the inner face 4 of the outer part 1. Thus, there is no contact between the two faces in the assembled condition of the joint.

The cage 15 includes circumferentially distributed windows 18. The circumferential arrangement of the windows 18 corresponds to the arrangement of the inner running grooves 14 and outer running grooves 3. The windows each accommodate a ball 19 which projects radially outwardly from the cage 15. The ball is received in and engages an outer running groove 3 while projecting radially inwardly towards the inner running groove 14. The balls 19 serve torque transmitting purposes.

The inner running grooves 14 and outer running grooves 3 extend in such that a control angle occurs. The control angle, during torque transmission, causes a force to be transferred from the balls 19 to the window face 21 and then to the cage 15. The force is directed towards the aperture 5 and thus holds the cage 15, via its hollow spherical face 17, in contact with the outer spherical face 8 of the inner part 7. The balls 19 center the inner part 7 and outer part 1 in the radial direction as a result of their contact in the outer running grooves 3 and inner running grooves 14 relative to one another. The centers 20 of all balls 19 are held in one plane. The plane is held aligned also by the position of the window faces 21, against which the balls 19 are pressed, relative to the position of the theoretical joint center the articulation center.

A guiding element 22 is provided in the form of a spherical layer. The guiding element 22, via its convexly spherical guiding face 23, is guided on the concave guiding face 9 in the inner part 7. The guiding element 22 includes two parallel faces 24, 25 of which the face 24 forms a contact face. In addition, the guiding element is provided with a bore 26 extending between the two faces 24, 25. The joint components are centered, for example, by selecting components to be assembled relative to one another. The outer part 1, the cage 15, the inner part 7 and the guiding element 22 are assembled to ensure that contact face 24 contains the articulation center 27 of the joint.

The inner joint part 7 is supported by the guiding element 22 against a supporting element 28. The supporting element 28 includes a setting face 31. The contact face 24 rests against the setting face 31. The supporting element 28 is a plate metal part. The supporting element 28 includes a portion 32 extending substantially radially with reference to the longitudinal axis 2 of the outer part. A cup-like recess in the supporting element extends in the direction of the longitudinal axis 2 of the outer part and has been given the reference number 30. The supporting element 28, via the radially extending portion 32, rests against the stop face 29 of the outer part 1. The supporting element is axially fixed relative to the outer part 1 by holding bushes 34. Collars 33 are inserted into circumferentially distributed bores. The setting face 31 is also provided with an indentation arranged in the region of the longitudinal axis 2 of the outer part.

The drawing shows the joint in its extended position. The longitudinal axis 2 of the outer part and the longitudinal axis 10 of the inner part are identical. When, for example, the inner part 7 is articulated relative to the outer part 1, the longitudinal axis 10 of the inner part assumes an angular position relative to the longitudinal axis 2 of the outer part. The balls 19 in the outer running grooves 3 and inner running grooves 14 move at the same time. The inner part 7 pivots around the articulation center 27 relative to the outer part 1. The cage 15, too, pivots around the articulation center 27 relative to the outer part 1 and the inner part 7. The cage is adjusted to half the articulation angle between the longitudinal axis 2 of the outer part and the longitudinal axis 10 of the inner part. The plane containing the ball centers 20 extends through the articulation center 27. The inner part 7 is centered relative to the outer part 1 only by the balls 1 9. The balls 19, during articulation, may assume other radial positions resulting from the design of the two joint parts 7, 1 and production tolerances. The inner part 7 is able to adjust itself radially relative to the outer part 1 due to the guiding element 22. The guiding element 22, via its contact face 24, is able to slide radially on the setting face 31. The indentations 12, the bore 26 and the indentation 35 also contribute towards a gentle articulation process without any risk of jamming. However, above all, this is achieved by the arrangement of the contact face 24 in that it contains the articulation center 27.

Figure 2:
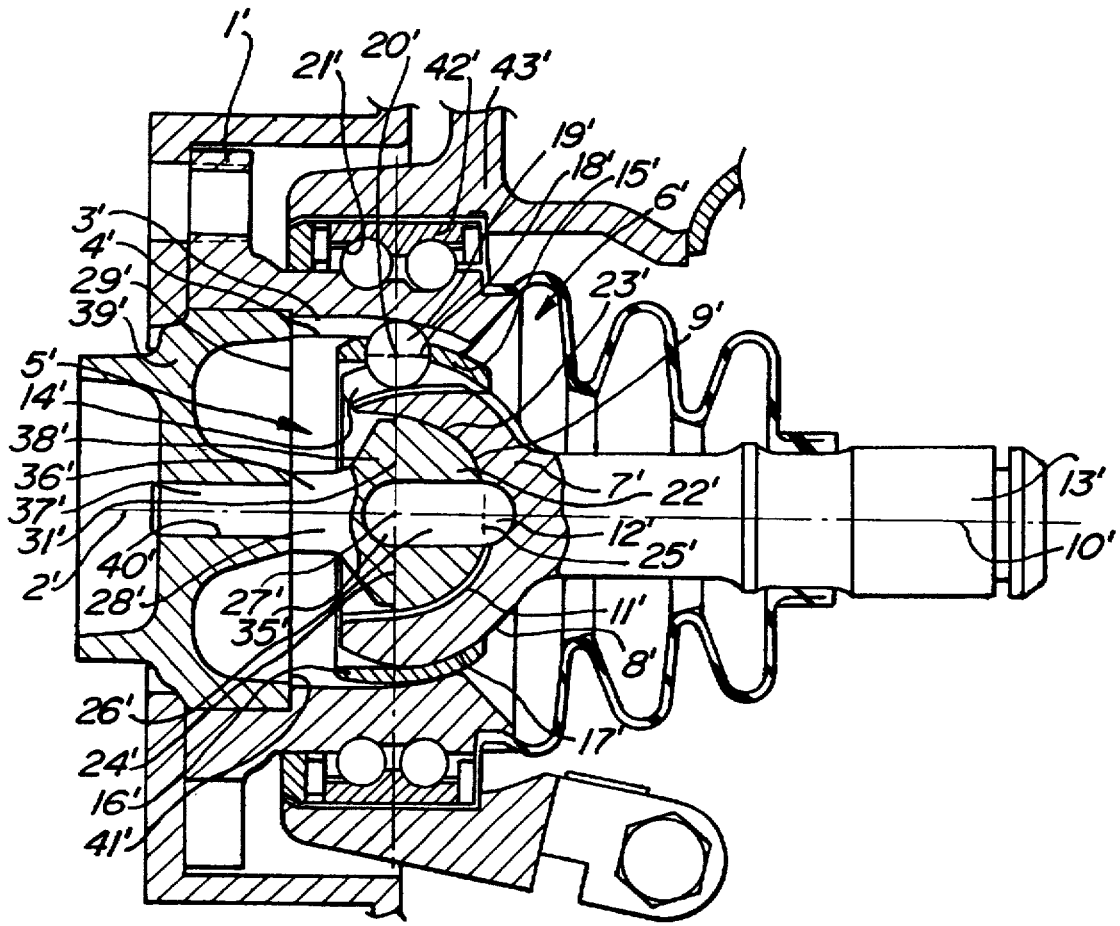
FIG. 2 is a longitudinal section view through a constant velocity fixed joint which forms part of a wheel bearing unit and is intended for large articulation angles.

FIG. 2 shows a different embodiment of a constant velocity fixed joint which, as compared to the embodiment of FIG. 1, permits a larger articulation angle. The outer part 1 is shown as a solid part. The outer running grooves 3 are also formed into the outer part 1', starting from the aperture 5'. The outer running grooves 3 extend in the same way as described in connection with FIG. 1. The track base of the outer running grooves 3', extend from the first aperture 5' of the outer part to the second aperture 6'. The track base approaches the longitudinal axis 2' of the outer part, which means that the outer running grooves 3' are undercut-free.

An inner part 7' is also provided in the form of a solid part. The inner part outer spherical face 8' serves to guide the cage 15' via its hollow spherical partial face 17'. The inner part 7' also includes a concave spherical guiding face 9' which is centered on the longitudinal axis 10' of the inner part. The inner part 7' includes grooves 11' and a central indentation 12'. The inner part 7' is provided with a connecting journal 13'. The outer face of the inner part 7' is provided with inner running grooves 14'. Again, the inner part 7' is centered relative to the outer part 1' in the radial direction entirely by balls 19'.

The center 20 ' of the balls 19' are held in one plane via 18' windows of the cage 15', with the outer face 16' of the cage 15' arranged at a distance from the inner face 4' of the outer part 1'. Under torque transmitting conditions, the balls 19' are held in contact with the window face 21'. The balls 19' hold the cage 15', by its hollow spherical partial face 17', in contact with the outer spherical face 8' of the inner part 7'. The recess of the inner part 7', which contains the concave guiding face 9', is engaged by a convex guiding face 23', which is a spherical layer, of a guiding element 22'.

The guiding element 22' includes a contact face 24' and a face 25' extending parallel thereto. A bore 26' extends between the two faces 24', 25'. The contact face 24' is arranged in such a way to form a plane which contains the articulation center 27' of the joint. In the axial direction, the inner part 7' is held relative to the outer part on the theoretical articulation center by the guiding element 22'. For this purpose, the guiding element 22' is axially supported against a supporting element 28' which includes a setting face 31". The setting face 31' forms part of the plate 38'.

Towards the aperture 5', the plate 38' is followed by a shank 36' whose diameter is reduced relative to that of the plate. The shank 36' includes a journal 37' whose diameter is stepped relative to the shank 36'. The supporting element 28', via the journal 37', engages a bore 40' in a holding element 39'. The holding element 39' is inserted into a recess of the outer part 1'. The holding element 39', via its stop face 41', rests against a corresponding stop face 29' of the outer part 1'. On the outer circumference of the outer part 1', a bearing 42' is attached. The bearing 42' is a tapered seat ball bearing whose outer race engages a bore of a wheel carrier 43', for example, a steered and driven front wheel of a passenger car.

In the region of the longitudinal axis 2"of the outer part, the plate 38' of the supporting element 28' includes an indentation 35'. The guiding element 22' also includes a through-bore 26' arranged opposite the indentation 35' when the joint is in the extended condition. The inner part 7' includes a corresponding indentation 12' in the guiding face 9' which is centered on the longitudinal axis 10' of the inner part.

While the above detailed description describes the preferred embodiment of the present invention, the invention is susceptible to modification, variation and alteration without deviating from the scope and fair meaning of the subjoined claims.

I claim:

1. A fixed constant velocity joint comprising:

a hollow outer part defining a cavity and including a first aperture and a second aperture at each end, said first aperture greater in diameter than said second aperture, an inner face of the outer part includes outer running grooves extending in meridian planes with reference to a longitudinal axis of the outer part, a stop face of the outer part formed relative to the outer running grooves such that the distance from the stop face to the joint articulation center is accurately controlled, said stop face constructed perpendicular to the longitudinal axis of the outer part;

an inner part arranged in the cavity of the outer part, an outer face of the inner part includes inner running grooves extending in meridian planes with reference to a longitudinal axis of the inner part and the inner running grooves positioned opposite the outer groove;

a torque transmitting ball is accommodated in each opposed inner running groove and outer running groove, said inner running and outer running grooves both being undercut free, a cage which jointly guides said balls, cage partly occupying the space between the inner face of the outer part and the outer face of the inner part, said cage including a hollow spherical partial face guided on an outer spherical face of the inner part, said outer spherical face of the inner part arranged towards the second aperture, and an outer face of the cage arranged with play relative to the inner face of the outer part;

guiding means for accommodating movement between said inner and outer parts, said guiding means abutting said inner part and including a first convexly spherical guiding face of a guiding element, a contact face of said guiding element is radially adjustably guided on a setting face of a supporting element to radially adjust the guiding face, said supporting element fixed relative to the outer part and the longitudinal axis of the outer part being positioned perpendicularly to said setting face, and said inner part, the outer part and the cage being articulatable relative to one another around the joint articulation center; and said guiding element being partially spherical, with at least one planar face, said guiding element planar face serves as the contact face which constitutes the plane containing the articulation joint center, and said supporting element, at the setting face, includes the plane of the contact face.

2. A fixed constant velocity joint according to claim 1, wherein the supporting element is fixed directly to the outer part.

3. A fixed constant velocity joint according to claim 1, wherein the supporting element is attached to a holding element fixed to the outer part.

4. A fixed constant velocity joint according to claim 3, wherein the holding element rests against the stop face of the outer part.

5. A fixed constant velocity joint according to claim 1, wherein the supporting element is a plate metal part.

6. A constant velocity joint according to claim 1, wherein the supporting element includes a plate including the setting face and a tapered shank with a journal whose cross-section is stepped relative to the shank and a holding element including a bore for receiving the journal.

7. A constant velocity joint according to claim 1, wherein the supporting element rests against a stop face of the outer part.

8. A fixed constant velocity joint according to claim 1, wherein the supporting element includes a tapered portion adjoining a plate portion including the setting face.

9. A fixed constant velocity joint according to claim 1, wherein the stop face of the outer part is formed with a tool introduced to contact both the outer running grooves and the stop face of the outer part when calibrating or stamping the outer running grooves.

10. A fixed constant velocity joint according to claim 1, wherein the contact of the guiding element includes an indentation at the center.

11. A fixed velocity joint according to claim 1, wherein the guiding element has two planar faces, the two planar faces each include an indentation at the center of the planar faces.

12. A fixed constant velocity joint according to claim 11, wherein the indentations are provided in the form of a through-bore.

13. A fixed constant velocity joint according to claim 1, wherein the inner part includes a concave spherical guiding face provided with an indentation in the region of the longitudinal axis of the inner part.

14. A fixed constant velocity joint according to claim 13, wherein the setting face of the supporting element is provided with an indentation in the region of the longitudinal axis of the outer part.

* * * * *

UNITED STATES PATENT AND TRADEMARK OFFICE
CERTIFICATE OF CORRECTION

PATENT NO. 5,797,801
DATED       August 25, 1998
INVENTOR(S) Werner Jacob

It is certified that error appears in the above-identified patent and that said Letters Patent is hereby corrected as shown below:

In the Abstract, line 1, delete "having"

Column 2, line 47, after "part" insert --.--

Column 4, line 45, after "guiding element" insert --22--

Column 5, line 31, "outer part 1" should be --outer part 1'--

Column 5, line 31, "grooves 3" should be --grooves 3'--

Column 5, line 33, "grooves 3" should be --grooves 3'--

Column 5, line 50, "center" should be --centers--

Column 5, line 51, "18' windows" should be --windows 18'--

Column 6, line 2, "face 31''" should be --face 31'--

Column 6, line 16, "2''" should be --2'--

UNITED STATES PATENT AND TRADEMARK OFFICE
CERTIFICATE OF CORRECTION

PATENT NO. 5,797,801
DATED       :August 25, 1998
INVENTOR(S) :Werner Jacob

It is certified that error appears in the above-identified patent and that said Letters Patent is hereby corrected as shown below:

Column 6, line 47, Claim 1, "groove" should be --running grooves--

Column 6, line 52, Claim 1, before "cage" insert --said--

Column 8, line 10, Claim 10, after "contact" insert --face--

Signed and Sealed this

Sixteenth Day of November, 1999

Attest:

Q. TODD DICKINSON

*Attesting Officer*                *Acting Commissioner of Patents and Trademarks*